United States Patent [19]

Schirle

[11] Patent Number: 5,870,247
[45] Date of Patent: *Feb. 9, 1999

[54] EXTENDER FRAME FOR COOLING A DISK DRIVE

[75] Inventor: Neal Bertram Schirle, Morgan Hill, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 747,481

[22] Filed: Nov. 12, 1996

[51] Int. Cl.⁶ .................................................. G11B 17/02
[52] U.S. Cl. ............................................... 360/97.02
[58] Field of Search ........................ 360/97.01–97.04; 361/687

[56] References Cited

U.S. PATENT DOCUMENTS

| | | | |
|---|---|---|---|
| 4,488,193 | 12/1984 | Davis et al. | 360/98 |
| 5,223,993 | 6/1993 | Squires et al. | 360/77.08 |
| 5,301,178 | 4/1994 | Okabe et al. | 360/97.02 |
| 5,454,157 | 10/1995 | Ananth et al. | 29/603 |
| 5,463,507 | 10/1995 | Morehouse et al. | 360/97.02 |

*Primary Examiner*—Robert S. Tupper
*Attorney, Agent, or Firm*—Gray Cary Ware & Freidenrich

[57] ABSTRACT

An extender frame is disposed between the enclosure and the circuit board of a high speed hard disk drive having a 1.0" form factor height, to improve cooling of the disk drive by directing air flow between the enclosure and card. After the extender frame is installed, the profile of the assembly is a 1.6" form factor height. To engage the frame with the drive, the circuit board is unfastened from the enclosure, the extender frame positioned between the card and enclosure, and then relatively longer fasteners are reinstalled through the enclosure, frame, and circuit board to hold the assembly together.

9 Claims, 2 Drawing Sheets

EXTENDER FRAME FOR COOLING A DISK DRIVE

BACKGROUND OF THE INVENTION

1. Field of the Invention

The present invention relates generally to computer storage media, and more particularly to methods and apparatus for improving the reliability of high performance hard disk drives.

2. Description of the Related Art

Disk drives are a ubiquitous form of computer data storage media. Essentially, a disk drive includes a combination of coaxially-stacked magnetic storage disks that are rotatably mounted via a spindle in an enclosure. The disk drive also includes one or more transducers, referred to as "heads". In accordance with well-known principles, the heads are controlled by a drive controller within the enclosure to position them for transfer of data to and from the disks as the disks rotate past the heads. Specifically, as the disks rotate, the heads are moved over the disks to transfer data to and from a plurality of concentric "tracks" on the disks.

It can readily be appreciated that a fundamental design consideration of a disk drive is its data transfer rate. It can be further appreciated that the faster the disks of a disk drive rotate, the faster the stored data rotates past and, thus, is available to, the heads. Consequently, faster disk rotation (e.g., 10,000 RPM) facilitates faster data transfer.

It happens, however, that increased disk rotation speed is not without cost. Specifically, the viscous dissipation, or heat generated by the disk spinning within the disk enclosure increases exponentially as disk rotation speed increases. Also, electronic components within and mostly attached to the enclosure of a high speed disk drive tend to generate significant heat. This increased heat generation, if left unchecked, can lead to increased rates of disk drive failure. In other words, the increased heat generated by high speed disk drives must be removed, or the reliability of the disk drive will be undesirably reduced.

It will be appreciated that one way to address the above-mentioned problem would be to redesign existing disk drives to more efficiently remove heat from the drive. For example, the enclosure might be redesigned to improve heat transfer. This could be accomplished with use of cooling fins on the enclosure as well use of highly thermally conductive materials. It is desirable, however, to avoid completely redesigning current disk drive structures and systems for which tooling has been built and basic design configurations have been proven. In other words, for cost and for product development reasons it is desirable not to render existing disk drive structural designs obsolete. Furthermore, it is desirable to provide a means by which users of existing disk drives can easily improve the heat removal capability of the drives. In addition, it is desirable to upgrade data storage systems by replacing the existing disk drives with higher performance disk drives. The storage system manufacturer or owner would like to perform such an upgrade without necessitating new cooling fins or other modifications to the storage system. As recognized by the present invention, it is possible to increase the reliability of high speed disk drives by improving the heat transfer rate from the drives, without rendering existing drive mechanical designs obsolete or rendering existing data storage system designs obsolete.

Accordingly, it is an object of the present invention to provide a system for improving the heat removal capability of a hard disk drive. Another object of the present invention is to provide a system for improving the heat removal capability of a disk drive, without requiring redesign of the drive enclosure, the computer, or the data storage system that houses the drive or drives. Still another object of the present invention is to provide a system for improving the heat removal capability of a disk drive which is easy to use and cost effective.

SUMMARY OF THE INVENTION

A system is disclosed for improving heat transfer in a disk drive which includes an enclosure, a plurality of disks rotatably mounted therein, at least one circuit board, and a plurality of fasteners for attaching the circuit board to the enclosure. As disclosed in detail below, the system includes an extender frame that is positionable between the enclosure and the circuit board. Per the present invention, the extender frame is formed with clearance holes for receiving the fasteners therein. With this structure, the extender frame establishes a passageway for air flow between the circuit board and the enclosure when the extender frame is engaged with the circuit board and enclosure.

In a preferred embodiment, the passageway for air flow defines an air flow direction, and the extender frame includes a plate. A plurality of elongated fins are preferably formed on the plate, and the fins are oriented parallel to the air flow direction. Additionally, the extender frame may also include scoops that extend from each end of the plate and that define obtuse angles with respect to the plate for directing air between the circuit board and the enclosure. Advantageously, the extender frame can be formed with a slot or opening, and a plastic connector can pass through the slot for receiving an electrical lead therein. Thereby, electrical communication between the electrical card and the enclosure can be established. The system is also disclosed in combination with the hard disk drive, and with a computer.

In another aspect, a hard disk drive includes an enclosure configured for rotatably holding a plurality of computer storage disks therein. A circuit board is configured for holding a plurality of electrical components that are associated with the storage disks. In accordance with the present invention, an extender frame is disposed between the enclosure and the circuit board, and the extender frame defines an air flow passageway between the enclosure and the circuit board to promote cooling of the hard disk drive.

In yet another aspect, a computer includes a hard disk drive and an extender frame attached to the hard disk drive for promoting air flow between an enclosure of the drive and an circuit board of the drive.

In still another aspect of the present invention, a method is disclosed for cooling a hard disk drive which has an enclosure coupled to an circuit board. The method contemplates undertaking its intended function in part by adding surface area to a disk drive that increases the thermal transfer coefficient of the drive. The added surface area amplifies the cooling produced by convection. As disclosed below, the method includes decoupling the enclosure and circuit board, and disposing an extender frame between the enclosure and circuit board. Then, the enclosure is connected to the circuit board with the extender frame disposed therebetween, such that an air flow passageway is established between the enclosure and circuit board.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
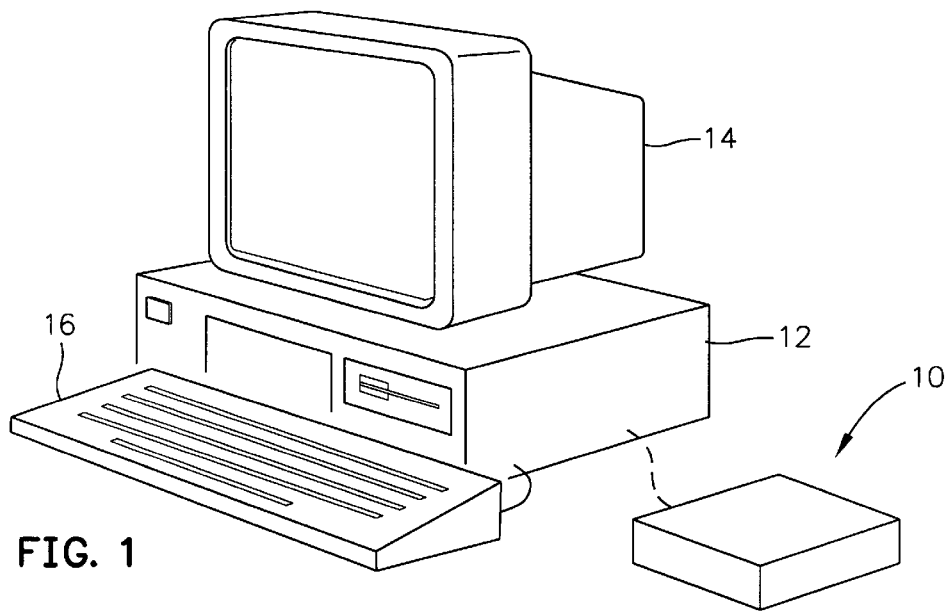
FIG. 1 is a perspective view of a disk drive, configured to illustrate the present invention, in an exploded relationship with a computer.

Referring initially to FIG. 1, a disk drive is shown, generally designated 10, in an exploded relationship with a computer 12. It is to be understood that the disk drive 10 is a removable disk drive or an internal disk drive that is in data communication with the computer 12 in accordance with principles well-known in the art. In one preferred embodiment, the disk drive 10 includes an enclosure having a so-called 3.5" form factor with a so-called 1.0" form factor height, although the principles of the present invention are widely applicable to many models of hard disk drives. Likewise, the computer 12 is preferably a personal computer or a data storage system with one or a multiplicity of disk drives, although the principles of the present invention are widely applicable to many models of computers. As shown in FIG. 1, the computer 12 is associated with a monitor 14 and a data entry device, such as a keyboard 16, in accordance with principles well-known in the art.

Although shown with a computer, it is to be understood that a disk drive with my novel extender may also be used in, or with, a variety of devices that includes, without limitation, a data storage system, a server, a facsimile machine, and so on.

Figure 2:
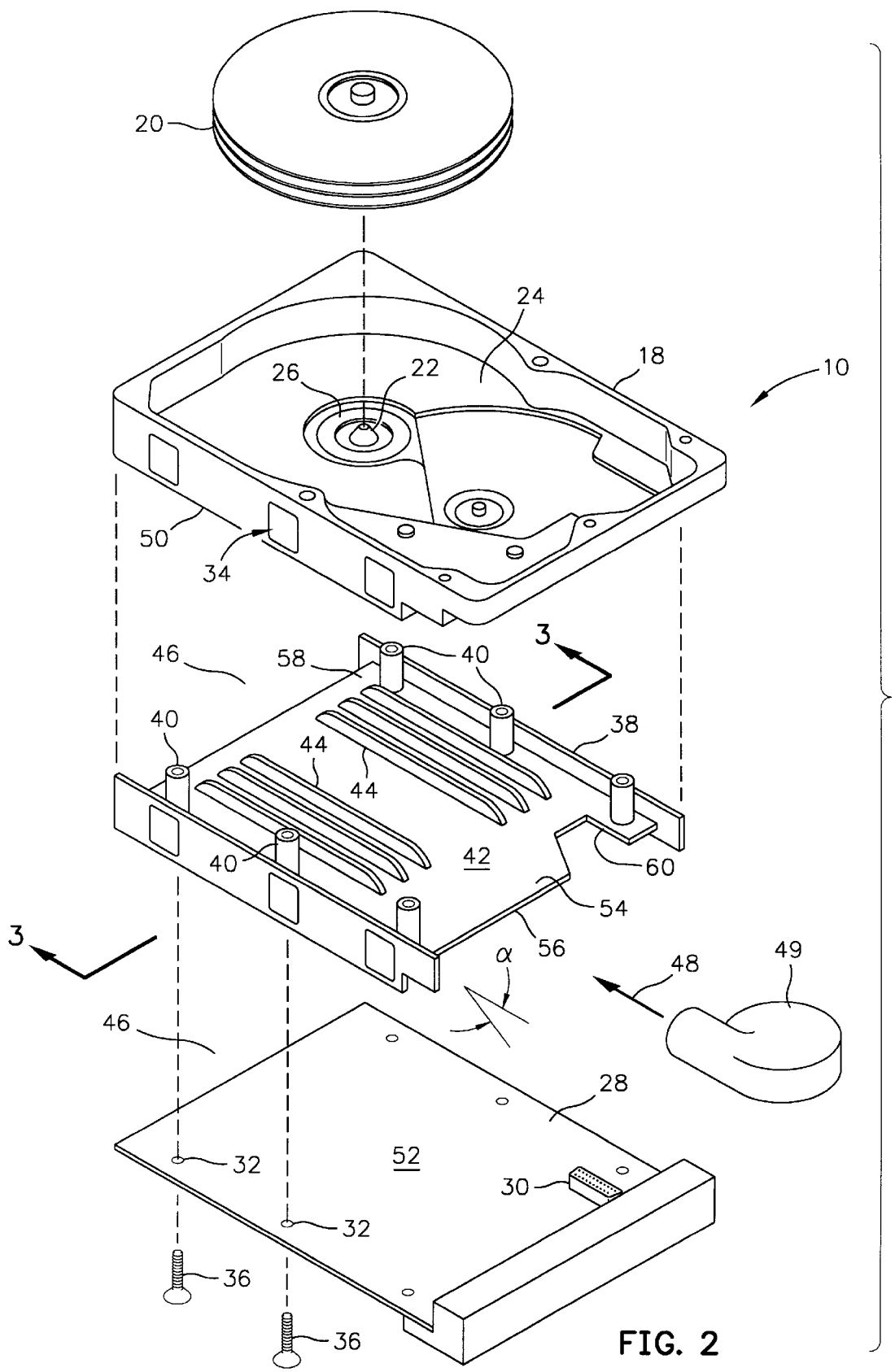
FIG. 2 is an exploded view of the disk drive of FIG. 1, with the top cover removed for clarity, with the fan shown schematically and with the actuator not shown.

Referring now to FIG. 2, the disk drive 10 includes a hollow, rigid, generally parallelepiped-shaped enclosure 18 and a plurality of hard disks 20 rotatably engaged therewith by means of a spindle motor 22. In the presently preferred embodiment, the enclosure 18 preferably is a 3.5" form factor, 1.0" height enclosure, and the spindle motor 22 rotates the disks 20 at high speeds, for example at ten thousand revolutions per minute (10,000 RPM).

As shown in FIG. 2, the enclosure 18 includes a bottom surface 24 that is formed with a downwardly-depending (relative to the perspective shown in FIG. 2) motor well 26. In accordance with principles well-known in the art, the motor well 26 is generally cylindrical, and is configured for receiving the spindle motor 22 therein.

Additionally, the disk drive 10 includes a flat, rectangular circuit board 28 (also referred to in the art as an electronics card). As the skilled artisan will recognize, the circuit board 28 is configured for holding electrical components thereon that are used in the operation of the disk drive 10. Accordingly, a connector 30 is attached to the electronics card and is electronically connected to one or more electrical components on the circuit board 28 and to electrical components in the enclosure 18, to establish electrical communication therebetween per principles well-known in the art.

As shown in FIG. 2, the circuit board 28 is formed with clearance holes 32. Also, the enclosure 18 is formed with threaded holes (not shown) on its lower edges that are aligned with and respectively correspond to the card clearance holes 32. The location of one such hole is indicated by reference numeral 34. To hold the circuit board 28 against the enclosure 18, a plurality of threaded fasteners 36 (for clarity only two are shown) are engaged with the holes 32, 34.

In accordance with the present invention, a rigid metal extender frame 38 is disposed between the enclosure 18 and the circuit board 28. As shown in FIG. 2, the extender frame 38 is formed with frame holes 40 that are registered with the holes 32, 34 of the circuit board 28 and the enclosure 18. Accordingly, the fasteners 36 extend through the frame holes 40 when they are engaged as described with the holes 32, 34 of the circuit board 28 and the enclosure 18, to thereby hold together the assembly which includes the enclosure 18, the circuit board 28, and the extender frame 38. It is to be understood that the fasteners 36 are in all essential respects identical to enclosure fasteners known in the art, with the exception that the fasteners 36 are sufficiently long to extend through the frame receptacles 40 and engage both the receptacles 32 of the circuit board 28 and the receptacles 34 of the enclosure 18.

Per principles of the present invention, the extender frame 38 is cast from a metal, such as aluminum, that has a relatively high thermal conductivity. Alternatively, the extender frame 38 can be stamped, and it can be made of a metal other than aluminum. Owing to its low cost, light weight, and good thermal conductivity, however, aluminum is preferred.

FIG. 2 shows that the extender frame 38 includes a flat plate 42 that defines a plane. Preferably, a plurality of elongated fins 44 are formed on the plate 42. Preferably, two sets of three parallel fins 44 are formed on the base 42 as shown. Such fins can be placed on either or both sides of the plate.

Without the extender frame 38, air ordinarily does not flow between the enclosure 18 and the circuit board 28. In accordance with the present invention, however, the extender frame 38 defines an air flow passageway 46 between the circuit board 28 and the enclosure 18, and the fins 44 are oriented parallel to the direction 48 of air flow from a system cooling fan 49 through the air flow passageway 46. The fins 44 increase the surface area to promote convective heat transfer as is common in the art.

In the preferred embodiment shown in FIG. 2, the air flow passageway 46 is on both sides of the extender frame 38. Consequently, the extender frame 38 advantageously directs air over both a lower surface 50 of the enclosure 18, and an upper surface 52 of the circuit board 28. With the extender frame 38, the fan 49 can be a conventional fan used with current disk drives that rotate at less than ten thousand revolutions per minute (10,000 RPM).

FIG. 2 further shows that the extender frame 38 includes a scoop 54 which extends away from the plate 42. Together, the scoop 54 and plate 42 establish a substantial part of the extender frame member.

As shown in FIG. 2, the scoop 54 defines a leading edge 56 that is perpendicular to the direction 48 of air flow through the air flow passageway 46. Preferably, to direct air toward the enclosure 18, the scoop 54 slopes downwardly from the plate 42 toward the fan 49. Consequently, the scoop 54 defines an obtuse angle α with respect to the plate 42. The angle α is established to direct and throttle air flow between the extender frame 38 and enclosure 18 which is sufficient, in combination with the particular system cooling fan 49, for cooling the enclosure 18.

If desired, a second scoop 58 that is in all essential respects identical in configuration and operation to the scoop 54 can be formed on the end of the base 42 that is opposite to the end on which the scoop 54 is formed. In this way, the extender frame 38 is configured for undertaking its function in systems having cooling air flow in either direction with respect to the ends of the disk drive 10.

Still referring to FIG. 2, the extender frame 38 is formed with a rectangular slot 60. In the embodiment shown, the slot 60 is formed through the scoop 54. Additionally, the disk drive 10 includes the connector 30, preferably embodied in a parallelopiped-shaped hollow plastic receptacle connector. The connector 30 fits through the slot 60, which provides clearance between itself and the connector. It is to be understood that the connector 30 is intended to mate with a corresponding pin connector (not shown) on the underside of the enclosure 18. Thereby, electrical communication is established between the electrical card 28 and the enclosure 18. The connector 30 is similar to, but taller than, the connector used for the standard 1.0" form factor height without the extended frame. (Here "taller" means longer in the dimension perpendicular to the plane of the electronics board.)

Figure 3:
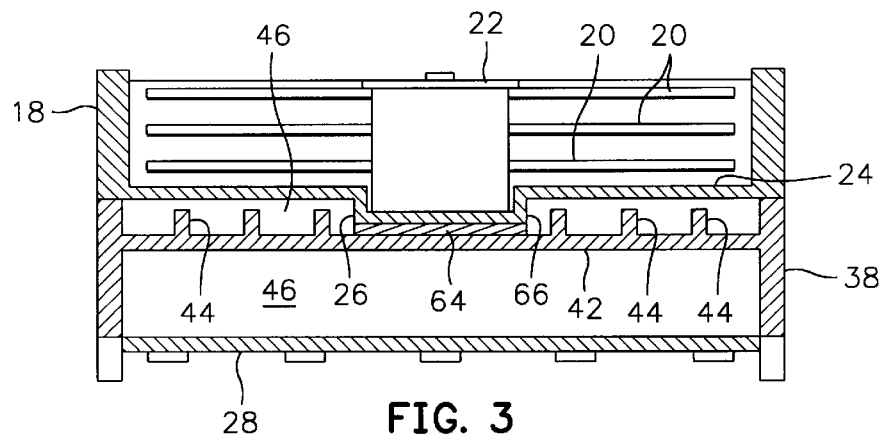
FIG. 3 is a cross-sectional view as would be seen along the line 3—3 in FIG. 2 with the components engaged with each other.

Referring briefly to FIG. 3, the extender frame 38 includes a thermally conductive strip 64. As shown, the strip 64 can be attached to or formed integrally with the plate 42. It can be readily appreciated in reference to FIG. 3 that the strip 64 rises from the plate 42 toward the enclosure 18, and the strip 64 contacts the bottom surface 66 of the motor well 26 for conducting heat from the bottom surface 66 to the plate 42. In one presently preferred embodiment, the strip 64 is disk-shaped.

It may now be appreciated that the extender frame 38 promotes cooling of the disk drive 10 by increasing the surface area of the disk drive 10. Furthermore. the extender frame 38 promotes convective cooling of the disk drive 10 by directing cooling air between the enclosure 18 and circuit board 28, which are ordinarily exposed to cooling air on their outside surfaces. Thus, the system shown in FIGS. 1–3 results in cooling air from the fan 49 in being directed on both sides of the enclosure 18 and the circuit board 28. Still further, the system shown in FIGS. 1–3 promotes conductive heat transfer from the spindle motor well 26 to the extender frame by means of the thermally conductive strip 64.

Figure 4:
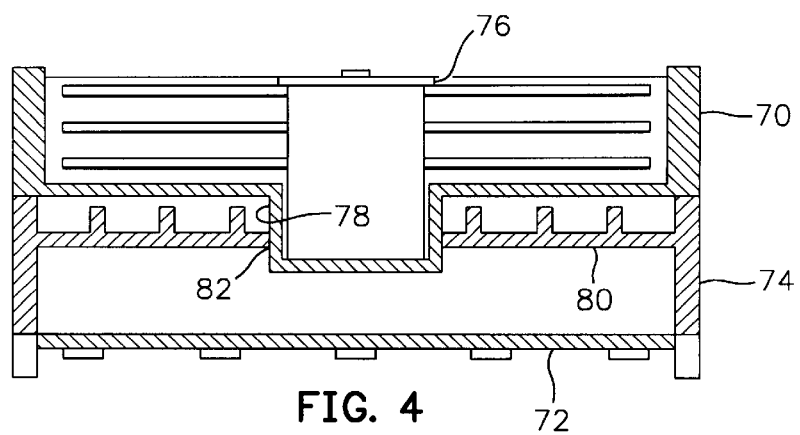
FIG. 4 is a cross-sectional view of an alternate embodiment having a hole formed in the extender frame for receiving a relatively large motor well of the enclosure, as would be seen along the line 3—3 in FIG. 2 with the components engaged with each other.

Now referring to FIG. 4, in an alternate embodiment an enclosure 70 and circuit board 72 are separated by an extender frame 74, with the enclosure 70, circuit board 72, and extender frame 74 shown in FIG. 4 being substantially identical in configuration and operation to the enclosure 18, circuit board 28, and extender frame 38 shown in FIGS. 1–3, with the following exceptions. The enclosure 70 shown in FIG. 4 incorporates a relatively large spindle motor 76 and, hence, a relatively deep motor well 78. Accordingly, a plate 80 of the extender frame 74 is formed with a hole 82 for receiving the motor well 78 therethrough.

While the particular EXTENDER FRAME FOR COOLING A DISK DRIVE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:
1. A hard disk drive, comprising:
an enclosure adapted to receive a plurality of hard disks therein;
a circuit board;
a plurality of electrical components on the circuit board; and
an extender frame disposed between the enclosure and the circuit board and defining an air flow passageway therebetween, the extender frame including:
a base plate with a plurality of fins that extend into the airflow passageway; and
a scoop;
the enclosure including a motor well defining a bottom surface;
the extender frame including a thermally conductive element on the base plate, near the bottom surface; and
the thermally conductive element contacting the bottom surface.
2. The hard disk drive of claim 1, further comprising a plurality of fasteners, and the extender frame further comprising a plurality of clearance holes for fasteners, at least some of the clearance holes in the plate and some of the clearance holes in the scoop.
3. The hard disk drive of claim 1, wherein the extender frame is formed with a slot, and the disk drive further comprises a connector passing through the slot for establishing electrical communication between the circuit board and the enclosure.
4. The hard disk drive of claim 1, wherein the enclosure is formed with a motor well defining a bottom surface, and the extender frame is formed with a hole for receiving the bottom surface therethrough.
5. The hard disk drive of claim 4, in combination with a computer.
6. A cooled hard disk drive, comprising:
generally parallelopiped enclosure;
a spindle motor in the enclosure;
a plurality of hard disks rotatably mounted to the spindle motor;
a bottom surface of the enclosure;
a generally cylindrical, downwardly deparding motor well in the bottom surface;
the spindle motor being received in the motor well;
a generally rectangular circuit board disposed beneath the bottom surface;
a connector mounted on the circuit board;
first clearance holes the enclosure;
second clearance holes in the circuit board;
a rigid, thermally conductive, metal extender frame disposed between the bottom surface and the circuit board;
frame holes in the extender;
fasteners that extend through the second clearance holes, the frame holes, and the first clearance holes for holding together the enclosure, the frame, and the circuit board;
an air flow passageway defined between the frame and the circuit board;
a plurality of sets of fins formed on the frame;
a first scoop formed in the frame, the scoop defining an angle a for directing air flow toward the enclosure;
a second scoop formed in the frame at a location opposite the first scoop;

a slot in the frame for receiving the connector, the connector extending through the slot in a direction toward the enclosure; and a strip of thermally conductive material on the frame, the strip disposed beneath and contacting the motor well.

7. The cooled hard disk drive of claim 6, further including a hole in the frame, the motor well extending downwardly, through the hole.

8. A data processing system, comprising:

a computer;

at least one cooled hard disk drive in the computer, the at least one disk drive including:
generally parallelopiped enclosure;
a spindle motor in the enclosure;
a plurality of hard disks rotatably mounted to the spindle motor;
a bottom surface of the enclosure;
a generally cylindrical, downwardly departing motor well in the bottom surface;
the spindle motor being received in the motor well;
a generally rectangular circuit board disposed beneath the bottom surface;
a connector mounted on the circuit board;
first clearance holes in the enclosure;
second clearance holes in the circuit board;
a rigid, thermally conductive, metal extender frame disposed between the bottom surface and the circuit board;
frame holes in the extender;
fasteners that extend through the second clearance holes, the frame holes, and the first clearance holes for holding together the enclosure, the frame, and the circuit board;
an air flow passageway defined between the frame and the circuit board;
a plurality of sets of fins formed on the frame;
a first scoop formed in the frame, the scoop defining an angle $\alpha$ for directing air flow toward the enclosure;
a second scoop formed in the frame at a location opposite the first scoop;
a slot in the frame for receiving the connector, the connector extending through the slot in a direction toward the enclosure; and,
a strip of thermally conductive material on the frame, the strip disposed beneath and contacting the motor well.

9. The data processing system of claim 8, wherein the disk drive further includes a hole in the frame, the motor well extending downwardly, through the hole.

* * * * *